United States Patent
Al-Azzawe

(10) Patent No.: US 7,324,961 B2
(45) Date of Patent: Jan. 29, 2008

(54) VIDEO RENTAL E-COMMERCE SOLUTION

(75) Inventor: Abdul Hamid Al-Azzawe, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 09/886,747

(22) Filed: Jun. 21, 2001

(65) Prior Publication Data

US 2002/0169656 A1    Nov. 14, 2002

Related U.S. Application Data

(60) Provisional application No. 60/290,457, filed on May 11, 2001.

(51) Int. Cl.
  *G06Q 30/00*    (2006.01)
  *G06F 7/00*    (2006.01)
(52) U.S. Cl. .......................... 705/26; 705/27
(58) Field of Classification Search .............. 705/26, 705/27
  See application file for complete search history.

(56) References Cited

U.S. PATENT DOCUMENTS

| | | | |
|---|---|---|---|
| 4,866,661 A | | 9/1989 | De Prins |
| 5,050,031 A | | 9/1991 | Weiley |
| 5,623,662 A | | 4/1997 | McIntosh |
| 5,963,625 A | * | 10/1999 | Kawecki et al. ........ 379/127.01 |
| 5,983,200 A | | 11/1999 | Slotznick |
| 6,622,148 B1 | * | 9/2003 | Noble et al. ............. 707/104.1 |
| 6,853,978 B2 | * | 2/2005 | Forth et al. .................... 705/26 |
| 2002/0154157 A1 | * | 10/2002 | Sherr et al. .................... 345/716 |
| 2002/0199182 A1 | * | 12/2002 | Whitehead ..................... 725/1 |
| 2005/0273827 A1 | * | 12/2005 | Javed et al. ................... 725/90 |

FOREIGN PATENT DOCUMENTS

JP    2000268099 A  *  9/2000

OTHER PUBLICATIONS

Business Editors, "E-VideoTV, Inc. Awards Contract To Burnt Sand Solutions Inc. To Develop An Internet-Enabled Video On Demand (VOD) E-Commerce Solution," Business Wire, New York, Sep. 13, 1999, p. 1.*

* cited by examiner

*Primary Examiner*—Yogesh C. Garg
*Assistant Examiner*—Amee A. Shah
(74) *Attorney, Agent, or Firm*—Sawyer Law Group LLP

(57) ABSTRACT

A method and system for providing a business-to-business network service for applications used by service providers is disclosed. The method and system include providing a central application capable of communicating with at least two applications over a public network, such as the Internet, and providing a repository database for storing customer information that spans more than one of the service providers. The method and system further include allowing the applications to query the repository database through the central application, thereby making the customer information accessible to each of the applications.

3 Claims, 3 Drawing Sheets

VIDEO RENTAL E-COMMERCE SOLUTION

CROSS-REFERENCE TO RELATED APPLICATION

This application is claiming under 35 USC 120 the benefit of provisional patent application Ser. No. 60/290,457 filed on May 11, 2001.

FIELD OF THE INVENTION

The present invention relates to Web services, and more particularly to a method system for providing a business-to-business e-commerce solution for retail rental businesses.

BACKGROUND OF THE INVENTION

A common need among video rental chains is to ensure that potential customers have suitable backgrounds and sufficient credit to become rental customers. Rental chains could also provide better service to their customers if they had access to the customer's rental history, a list of movie titles the customer is currently interested in viewing, ratings of previously viewed movies, and so on.

One solution available to video rental chains to provide such services is to develop tightly coupled intranet applications that allow each store in the chain to access a database containing such data directly. Customers, however, almost always rent from more than one rental chain. Video rental chains, as with most other businesses, do not readily share customer information with their competitors. Accordingly, any solution that is bounded by a particular video chain loses the benefit of a customer's history with other video rental chains.

Besides brick and mortar video rental chains, there are now Web based video businesses such as the WWW.IMDB.COM Web site and the WWW.NETFLIX.COM Web site, for example. The WWW.IMDB.COM Web site is a video business-to-consumer Web site that allows customers to build a wish list and review/rate movie tides. This Web based video rental business does not track customer rental history, credentials, or provide services to other rental businesses. WWW.NETFLIX.COM Web site is a Web based video rental cyberstore for DVDs. Again, this business tracks local customer information only, and cannot access it's customer rental history or credentials outside of its business boundaries.

In addition, these online video rental applications also have a problem with how movie title lists are displayed to users for selection. As users browse the rental applications sites, the movie title list displayed to the users are either query generated or automatically generated. Automatically generated lists include upcoming releases, new arrivals, and hot (top) rentals among other users. Query generated movie title list result from a search entered by the user, such as a search by actor, director, producer, writer, genre, and so forth, as well as a combination of these categories.

The purpose of movie title lists is to typically allow users to rent or buy a movie title, or to add the movie title to a wish list (i.e., registering and interest in a particular title). In order for the user to actually rent a title from the movie title list, the user must first click on one of the displayed movie titles. A new Web page specific to that movie title is then displayed showing the information for the movie as well as a button to "rent", "buy", or "add to wish-list" (in most cases, wish-lists are not even supported). The user must then click the appropriate button to perform the corresponding action (e.g., rent the movie title).

Although the traditional method for displaying movie title list effectively allows users to rent/purchase movie titles and is a useful feature, it requires an extra user click in order to drill down to the actual page where the user can rent/purchase the movie. Added to this, users are not told up-front if he/she has already purchased, rented, or added this title to the wish-list. In addition, there is no up-front indication of whether the title is even in stock and available before the user spends time navigating to the specific movie title pages from the movie title list.

Thus, video rental chains face the following limiting factors when conducting day-to-day rental business operations:

inability to suggest movie titles to their customers based on the customers renting history/preferences, no knowledge of the renting preferences/history of customers outside of each store's business location, restricted ability to evaluate credentials of new or existing customers that are to be entrusted with expensive rental items, and loss of revenue due to stolen titles by new customers inability to tell a user up-front if the user has already purchased, rented, or added a movie title to a wish-list, or whether the title is in stock and available without first navigating to the movie-specific web page.

In addition, video rental chains require manual and repetitive data entry of the movie title information, and such title descriptions are typically limited in scope.

What is needed, therefore, is an improved solution for video rental chains. The present invention addresses such a need.

SUMMARY OF THE INVENTION

The present invention is a method and system for providing a business-to-business network service for applications that are used by service providers, such as rental and retail applications. The method and system include providing a central application capable of communicating with at least two applications over a public network, such as the Internet, and providing a repository database for storing customer information that spans more than one of the service providers. The method and system further include allowing the applications to query the repository database through the central application, thereby making the customer information accessible to each of the applications.

According to the method and system disclosed where the service providers are video rental chains, for example, the present invention provides a more efficient way for video rental chains to serve and manage their customer base. The repository database provided by the network service makes validating customer credentials accessible by each registered rental chain, and provides consumer-based services by storing information such as customer rental history, wish-list registry, and a recommended video list for each customer no matter which rental chain the customer used. By making the customer information accessible to all registered rental chains, rental chains may increase their revenue per customer.

In a further aspect of the present invention, movie title lists are enhanced by displaying dynamic icons adjacent to the movie titles on the list, where a click on the dynamic icons initiates a corresponding action, such as "rent" or "buy". Accordingly, users are allowed to take immediate action with respect to a particular movie title without needing to first navigate to a separate movie title web page.

DETAILED DESCRIPTION OF THE INVENTION

The present invention relates to a Web service for service providers. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides a business-to-business network service for rental and retail chains. The present invention will be described in terms of a preferred embodiment where the network service is referred to herein as VideoCentral that is accessed by rental applications that are used by respective rental chains. Although a preferred embodiment of the present invention will be described in terms of servicing video rental stores, the present invention also applies to other types of rental stores, such as game and music rental stores, for instance, and to retail stores.

The purpose of VideoCentral is to provide a central data repository that may be accessed by registered rental chain applications. The VideoCentral application provides a suite of Web services to address the business needs of the rental video chains in two areas: business services that serve the administrative need of the video rental chains, and customer services that enable video rental chains to serve and manage their customer base.

The central repository provided by VideoCentral makes validating customer credentials accessible by each registered rental chain. The central repository also provides consumer-based services by storing information such as customer rental history, wish-list registry, and a recommended video list for each customer no matter which rental chain the customer used. By making the customer information accessible to all registered rental chains, it is possible for each rental chain to increase their revenue per customer.

Figure 1:
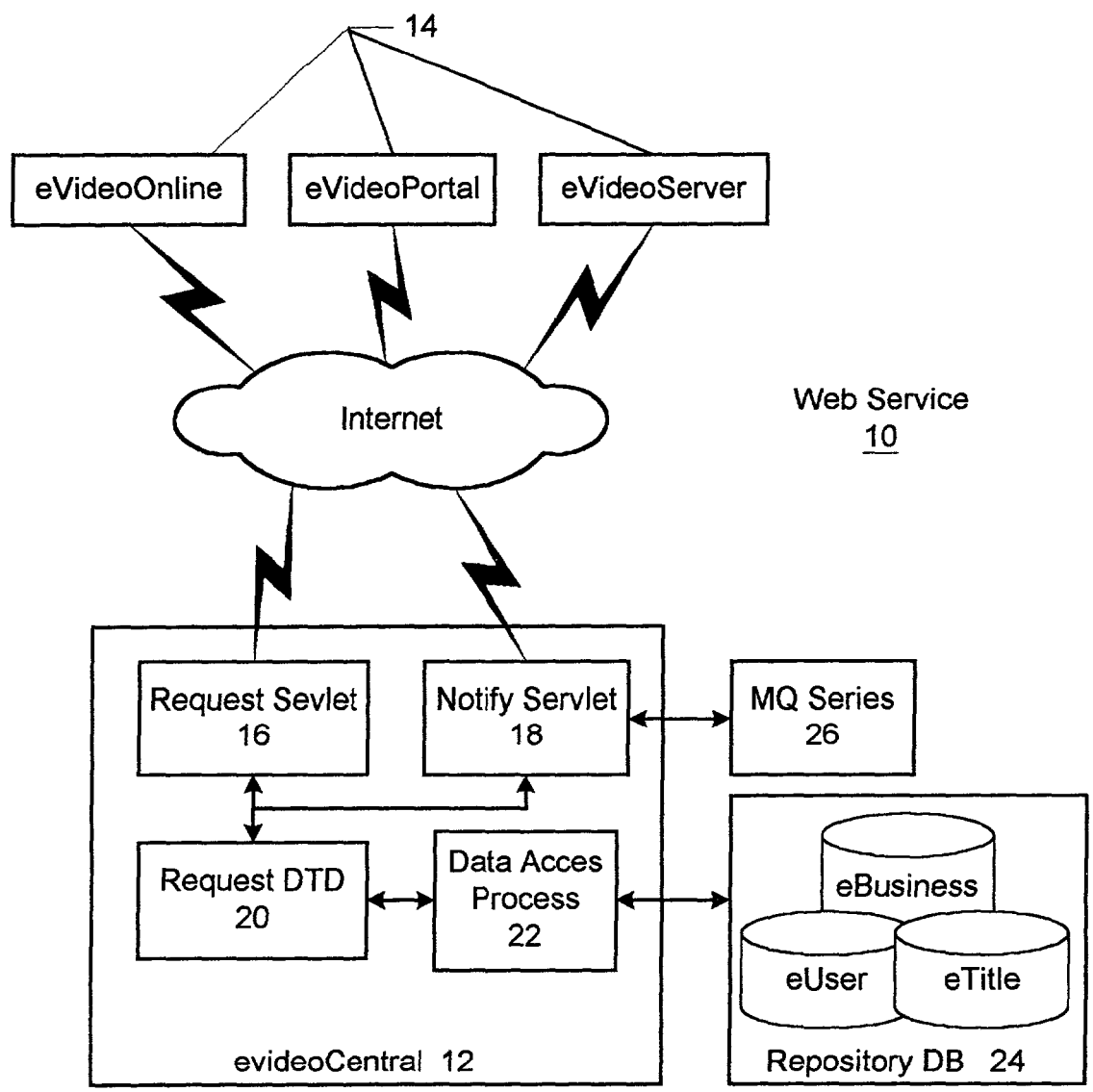
FIG. 1 is a block diagram of a B2B Web service for rental chains in accordance with a preferred embodiment of the present invention.

FIG. 1 is a block diagram of a B2B Web service for rental chains in accordance with a preferred embodiment of the present invention. The Web service 10 includes an VideoCentral application 12 and one or more video rental chain applications 14 that interact with the VideoCentral application 12 over a public network, such as the Internet, to provide value added features to their customers. Examples of different types of rental applications 14 include POS (Point of Sale) applications for rental stores, applications for Business to Consumer (B2C) online rental cyberstores, and applications for other Business-to-Business (B2B) online portals that further customize VideoCentral services as well as providing additional services.

The VideoCentral application 12 includes a request servlet 16, a notify servlet 18, a request DTD 20, a data access process 22, and a central repository database 24. According to the present invention, the central repository database 24 includes information that spans multiple video rental chains. The shared data is not business sensitive in the sense that no quantitative or qualitative information about one store location is passed to another store location. This information is censored in the sense that only customer information is shared between the video rental chains. In a preferred embodiment, however, since the customer credential reports stored in the repository database are similar to credit reports, customers of the video chains may be given the ability to request their credential reports directly from the VideoCentral application 12 and challenge the source/validity of the reports.

Data is exchanged between the rental chains and the VideoCentral application 12 in a Business-to-Business (B2B) fashion. In a preferred embodiment, there is no direct customer interaction with the VideoCentral application 12. Rather, only the rental applications 14 interact with the VideoCentral application 12 over the Internet.

Figure 2:
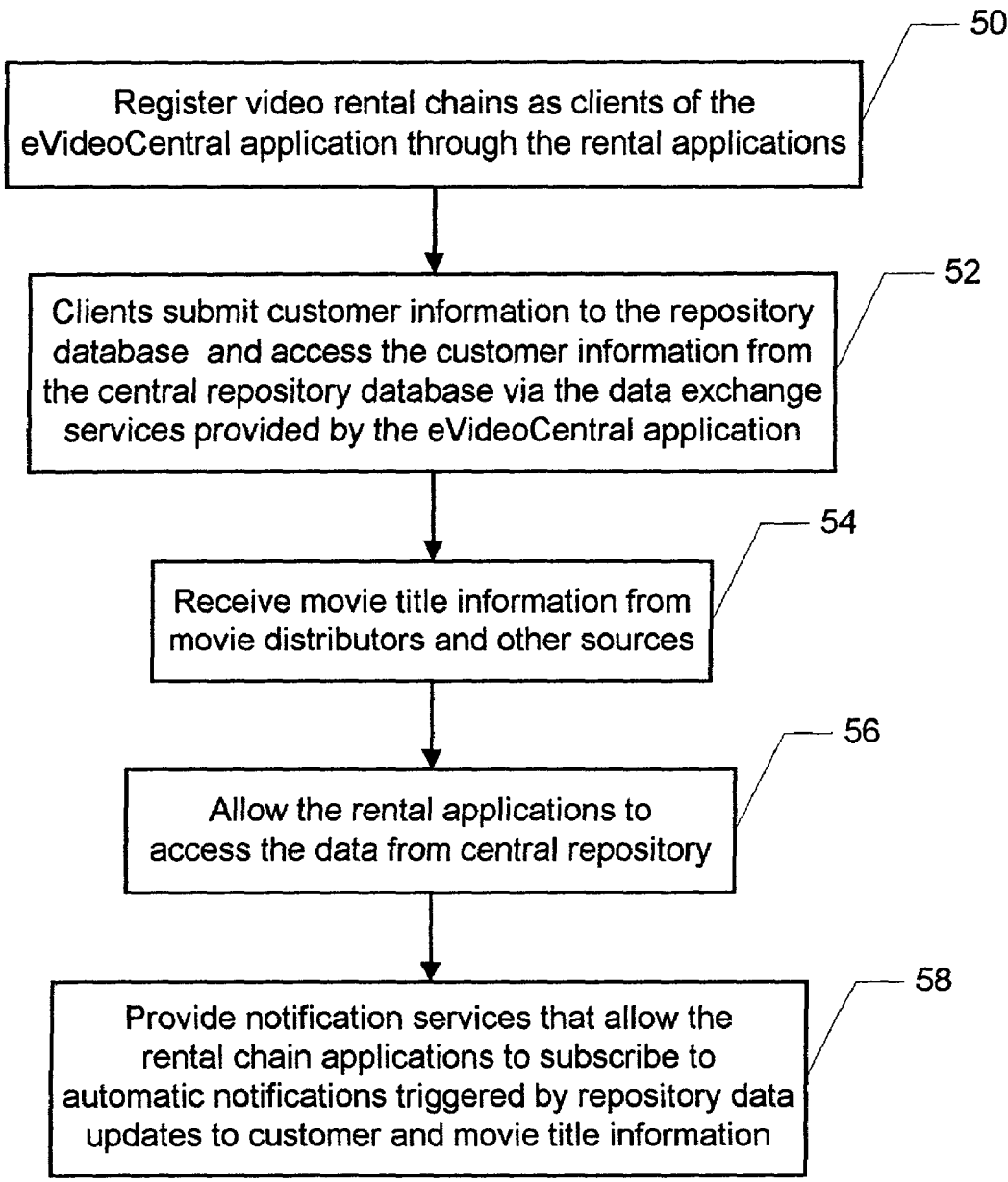
FIG. 2 is a flow chart illustrating a process for providing a Web service for rental chain applications in accordance with a preferred embodiment of the present invention.

FIG. 2 is a flow chart illustrating a process for providing a Web service for rental chain applications in accordance with a preferred embodiment of the present invention. The VideoCentral application 12 preferably provides video rental chains through their applications 14 with 1) registration services, 2) data exchange services, and 3) notification services.

Before becoming a client of the VideoCentral application 12 and accessing the repository database 24, a video rental chain must first register with the VideoCentral application 12 through the rental applications 14 in step 50. In a preferred embodiment, access to the repository data is made secure using either encryption or SSL (Secure Sockets Layer). Therefore, during the registration process, authentication keys may be generated to validate future data exchange requests made by the video rental chains.

After registration, clients may submit customer information to the repository database 24 and access the customer information from the central repository database 24 via the data exchange services provided by the VideoCentral application 12 in step 52. The data exchange services allows a client to report and access customer and movie title data. In accordance with the present invention, VideoCentral application 12 may receive the following data from each client:

List of business customers (renters).

Customer wish list data gathered through a manual or an online solution from the customers by the client applications 14. This is a list of titles a customer might be interested in renting in the future. This data is a value-added service for video rental chains to allow them to automatically suggest titles for customers as the wish-list entries become available. The wish list data is entered by customers over the Web or supplied by the various rental stores.

Customer rental history gathered through day-to-day rental operation of the client applications 14. This is a list of titles previously viewed by the customer. This data is a value added service for the video rental chains to facilitate the detection of duplicate title rentals. This would avoid having the customer return the title for exchange/refund. This data will also be used to recommend titles to customers through business intelligence database queries.

Customer evaluations (ratings) of various rental movie titles gathered through a manual or an online solution from the customers by the client applications 14. This data is a value added service for the rental chains to allow for the exchange of public opinion of movie titles.

Business customer evaluation and customer incident report gathered through submissions made by the client applications 14.

Thus, if a customer rents movies from more than one rental chain, those rental chains will submit chain-specific customer data to the VideoCentral application 12, thereby aggregating the customer's information across multiple rental chains. The data supplied by each respective video rental chain is secure to the chain; however, there may be some sharing of the data without identifying the chain from which the data originated. The sharing of data is required in order to provide the type of value-added and business intelligence service to all of the video rental chains.

Besides receiving data submitted by the rental chains, the VideoCentral application 12 also receives movie title information from movie distributors and other sources in step 54. The movie title information may include:

Movie titles and cast/crew. The title information could include storyline, actors, directors, and so on.

Movie title ratings. This information includes general public ratings of titles. This data is a value added service for video rental chains to allow for the exchange of public opinion of movie titles.

Making the movie title information accessible from the VideoCentral application 12 by the rental chain applications 14 eliminates the need for manual entry at the rental stores.

After customer data has been stored in the central repository 24, the VideoCentral application 12 allows the rental applications 14 to access the data from central repository 24 in step 56. The rental applications 14 may perform either simple queries or complex queries on the data. Simple queries access the data reported by the rental chains, such as title ratings, user wish list, and user rented list. According to the present invention, complex queries may be performed on the data stored in repository 24 that result in data mining. That is, based on the queries, the VideoCentral application 12 analyzes the data to uncover patterns and relationships relating to the customers' rental activities and histories. The results returned from such complex queries may include:

A recommend list—a list of titles automatically recommended by the VideoCentral application 12 for each customer. This data is used as a value-added service for the video chains to allow them to automatically suggest titles for customers. The recommend list is generated based on intelligent analysis the customers' personal information (age, sex, and so on) and critical data analysis of the customers rented list, title ratings and wish list in conjunction with the movie title data.

An order list—is a list of title names and quantities automatically recommended that VideoCentral application 12. This data is used as a value added service for the video rental chains to allow them to automatically determine which new release titles to order for their stores and how many. This data is generated based on historical data analysis of each store's customers each customers rented list, title ratings and wish list in conjunction with the movie title data.

A user ratings list—an overall evaluation of a customer's ratings based on input from the video rental chains.

A list of user infractions—a list of historical infractions committed by the customer (stolen rentals, lost rentals, damaged rentals, late rentals, arguments/disputes, and so on). This data is used to protect the video rental chains from loss of revenue due to renting titles to customers that may steal, damage, or lose the rented items. It serves as a way of validating new and existing customer credentials.

Accordingly, the present invention provides secure data sharing for the video rental chains and data mining derived through business intelligence on the shared data.

In a preferred embodiment of the present invention, the VideoCentral application 12 also provides notification services in step 58 that allow the rental chain applications 14 to subscribe to automatic notifications triggered by repository data updates to customer and movie title information. In a preferred embodiment, the notification services are handled by a MQ series server 26 (FIG. 1) from IBM, which is an asynchronous data propagation service provider.

Referring again to FIG. 1, in one preferred embodiment of the present invention, the format of the VideoCentral Web service data is XML, and the rental chain applications 14 interact with the VideoCentral application 12 by sending and receiving data in XML format. The XML scheme is generic enough such that it may be applied to a variety of applications 14.

In one preferred embodiment, the VideoCentral application 12 communicates via HTTP servlets or Simple Object Access Protocol (SOAP) envelopes. For HTTP, requests in the form of XML data are received by the request servlet as HTTP requests. The XML request is validated using the request DTD 20, which is an XML schema document type definition. After validation, the data access process 22 applies business logic to the request and accesses the data from the repository 24. The results are then sent back to the requesting application 14 through the notify servlet 18 in the form of XML.

In a preferred embodiment, the XML messages may also be contained in Simple Object Access Protocol (SOAP) envelopes. SOAP is an application invitation protocol developed by IBM, Microsoft, and others that defines a simple protocol for exchanging information encoded as XML messages. SOAP is in the process of being more formally specified by the World Wide Web Consortium (W3C) as XML protocol. SOAP makes no assumptions on implementation of the end points. This means that a service requester need only to create an XML request, send it to a service provider, and understand the XML response that comes back.

In a preferred embodiment, the database repository 24 includes three main components: eBusiness, eUser, and eTitle. ebusiness contains information on each of the video rental chains such as locations of stores, what type of information they qualify for, and so on. eUser contains information regarding each of the rental customers. And eTitle is the data that describes the various movie titles.

Using a centralized and secure repository database that spans multiple franchises in accordance with the present invention will provide rental business owners with the following value-add features:

1. Sets the maximum rental limits for customers based on their rental credentials to minimize loss;

2. Rewards good customers (frequent renters with good credentials);

3. Avoids duplicate rentals to customers where a customer forgets that he/she already rented a title in the past—no local management of the rented list is required;

4. Makes the wish list readily available to all stores to empower them to recommend titles that are in stock. The wish list is automatically updated on the VideoCentral database 24 as the customer rents/updates his list—no local management of the wish list is required;

5. Provides business intelligence queries for generating title rental recommendation list based on customer rental history, wish list, prior rating of rentals, and rental titles info. The data is more accurate than what would have been possible if access was limited to local store database only. The business intelligence queries also generate title purchase (quantity and type) list to businesses based on their customer preferences and new titles info;

7. Automatically updates new rental title information into local store databases, thereby avoiding manual and repetitive entry of newly purchased titles;

8. Shares cross-store customer rating and reviews of titles; and

9. Automatically notifies rental chains of user profile updates for those customers for which a business registers its interest in.

In a preferred embodiment of the present invention, the repository database 24 is not intended for access by customers or end users. However, in an alternative embodiment, the Web service 10 may be modified to allow limited access by individual end users over the Internet through a web browser. End users may then access and query movie title lists, which are enhanced in accordance with the present invention by displaying dynamic icons next to movie titles on the movie title lists.

Figure 3:
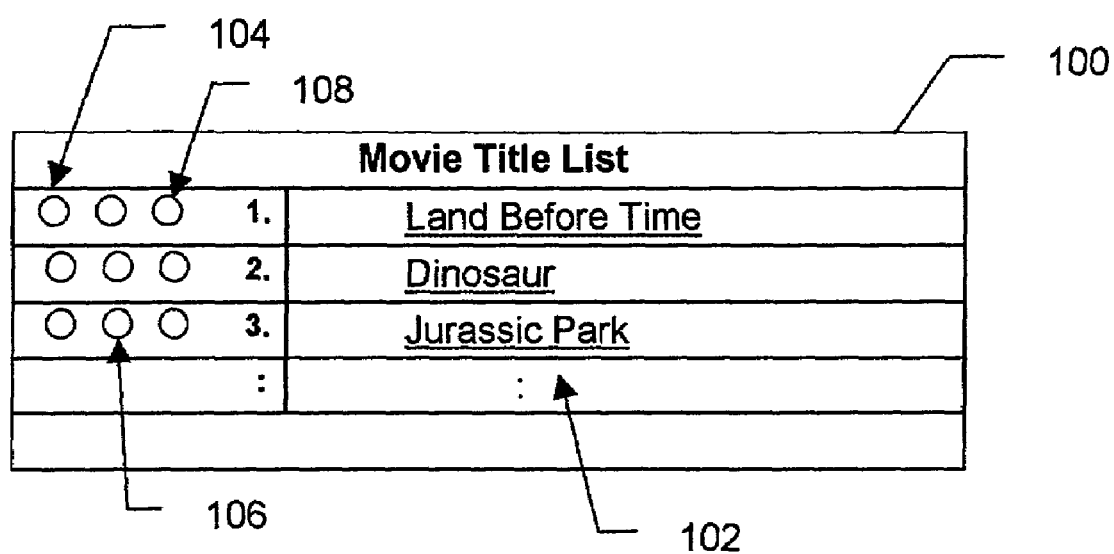
FIG. 3 is a diagram illustrating an enhanced movie title list in accordance with the present invention.

FIG. 3 is a diagram illustrating an enhanced movie title list 100 in accordance with the present invention. Compared to a traditional movie title list that only displays a list of movie titles 102 and perhaps a graphic of the movie jacket (not shown), the present invention displays dynamic icons 104-108 adjacent to each movie title 102 on the list 100. According to the present invention, a click on the dynamic icons 104-108 initiates a corresponding action, such as "rent" or "buy", thereby allowing the user to take immediate action with respect to a particular movie title 102 without needing to first navigate to a separate movie title web page.

In a preferred environment, the dynamic icons that may be displayed adjacent to movie titles 102 include:

An in stock or out of stock indicator 104.

An already rented/purchased indicator (if customer historical data indicates that the items already rented/purchased), order it command (if not ordered), or un-order it command 106. The customer historical data used may span multiple rental chains, or only span the history of the customer at a particular chain.

An already rented/purchased indicator, add to wish-list command (if not in the wish-list), or remove from wish-list command (if already in the wish-list) 108.

For purchase oriented online stores, the already purchased indicator may include an add to shopping cart command (if not added yet) or a remove from shopping cart command (if already in the shopping cart).

Accordingly, the dynamic icons of the present invention provide users with the following benefits:

Users are shown in advance if the title is available or not.

Users are shown in advance of the title is already rented/purchased.

Users are allowed at a very early stage to add or remove the item to/from the shopping cart.

Users are allowed a very early stage to add or remove the item to/from the ordered rental title list.

Users are allowed at a very early stage to add or remove the item to/from the wish-list.

Because the icons 104-108 may be small, the icons may also include a descriptive tool-tip (not shown) to describe the icons use in detail.

A method system for providing a B2B network service for rental chains has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for providing a business-to-business network service for applications used by service providers, the method comprising:

providing a central application capable of communicating with at least two rental applications over a public network;

providing a repository database for storing customer information that spans more than one of the service providers, wherein the service providers provide video rental services, wherein each service provider registers as clients with the central application through the at least two rental applications, and wherein the customer information comprises one or more of a list of business customers, a customer wish list, customer rental history, and customer evaluations;

receiving different customer information from each of the rental applications;

storing the customer information in XML format, and communicating between the rental applications and the network service using XML messages;

aggregating the customer information across the service providers;

allowing the rental applications to query the repository database through the central application, thereby making the customer information accessible to each of the rental applications, wherein the central application communicates via Hyptertext Transfer Protocol (HTTP) servlets or in Simple Object Access Protocol (SOAP) envelopes;

analyzing the customer information in the repository database to uncover patterns and relationships relating to the customers' rental activities and histories, wherein the repository database includes a first component for storing information regarding each of the service providers, a second component for storing information regarding each of the rental customers, and a third component for storing data that describes movie titles;

returning, in response to the queries, one or more of a recommended list, an order list, a user rating list, and a list of user infractions based on the analyzed customer information;

storing movie title information in the repository database, wherein the movie title information comprises movie title information from movie distributors;

making the movie title information accessible by the rental applications, and wherein making the movie title information accessible by the rental applications eliminates a need to manually enter information at the rental stores; and in response to a user accessing the repository database:

displaying a list of movie titles to a user based on the analyzed customer information;

displaying a combination of indicators from among a group comprising an in stock or out of stock indicator, an already rented/purchased indicator, an order command, an add to wish-list command, and an add to shopping cart command based on the analyzed customer information, and wherein the customer information includes customer historical data; and displaying the combination of indicators adjacent to each movie title on the list to allow the user to take action with respect to a particular movie title, wherein a click on an indicator initiates a corresponding action, wherein the user is enabled to take the action on a same movie title page that displays the list of movie titles without having to navigate to a separate movie title page in order to take the action.

2. A system for providing a network service for applications used by service providers comprising:

a central computer having a central application capable of communicating with at least two rental applications over a public network;

at least two service provider computers;

a network that connects the central computer with the at least two server provider computers; and a repository database residing at the central computer for storing customer information that spans more than one of the service providers, wherein the service providers provide video rental services, wherein each service provider registers as clients with the central application through the at least two rental applications, wherein the customer information comprises one or more of a list of business customers, a customer wish list, customer rental history, and customer evaluations, wherein the central application stores the customer information in XML format, and communicating between the rental applications and the network service using XML messages, and wherein the repository database receives different customer information from each of the rental applications, wherein the central application is operable to aggregate the customer information across the service providers, wherein the central application communicates via Hyptertext Transfer Protocol (HTTP) servlets or in Simple Object Access Protocol (SOAP) envelopes, wherein the rental applications may query the repository database through the central application, thereby making the customer information accessible to each of the rental applications, wherein the central application analyzes the customer information in the repository database to uncover patterns and relationships relating to the customers' rental activities and histories, and wherein the central application returns, in response to the queries, one or more of a recommended list, an order list, a user rating list, and a list of user infractions based on the analyzed customer information, wherein the repository database includes a first component for storing information regarding each of the service providers, a second component for storing information regarding each of the rental customers, and a third component for storing data that describes movie titles, wherein the central application stores movie title information in the repository database, wherein the movie title information comprises movie title information from movie distributors, wherein the central application stores makes the movie title information accessible by the rental applications, wherein making the movie title information accessible by the rental applications eliminates a need to manually enter information at the rental stores, wherein in response to a user accessing the repository database, the central application displays a list of movie titles to a user based on the analyzed customer information, wherein, in further response to the user accessing the repository database, the central application displays a combination of indicators from among a group comprising an in stock or out of stock indicator, an already rented/purchased indicator, an order command, an add to wish-list command, and an add to shopping cart command based on the analyzed customer information, wherein the customer information includes customer historical data, and wherein, in further response to a user accessing the repository database, the central application displays the combination of indicators adjacent to each movie title on the list that allow the user to take action with respect to a particular movie title, wherein a click on an indicator initiates a corresponding action, wherein the user is enabled to take the action on a same movie title page that displays the list of movie titles without having to navigate to a separate movie title page in order to take the action.

3. A computer-readable medium containing executable program instructions for providing a business-to-business network service for rental applications used by rental chains, the program instructions for:

providing a central application capable of communicating with at least two rental applications over a public network;

providing a repository database for storing customer information that spans more than one of the rental chains, wherein each rental chain registers as clients with the central application through the at least two rental applications, and wherein the customer information comprises one or more of a list of business customers, a customer wish list, customer rental history, and customer evaluations;

storing the customer information in XML format, and communicating between the rental applications and the network service using XML messages;

receiving different customer information from each of the rental applications;

aggregating the customer information across the service providers;

allowing the rental applications to query the repository database through the central application, thereby making the customer information accessible to each of the rental applications, wherein the central application communicates via Hyptertext Transfer Protocol (HTTP) servlets or in Simple Object Access Protocol (SOAP) envelopes;

analyzing the customer information in the repository database to uncover patterns and relationships relating to the customers' rental activities and histories, wherein the repository database includes a first component for storing information regarding each of the service providers, a second component for storing information regarding each of the rental customers, and a third component for storing data that describes movie titles;

returning, in response to the queries, one or more of a recommended list, an order list, a user rating list, and a list of user infractions based on the analyzed customer information;

storing movie title information in the repository database, wherein the movie title information comprises movie title information from movie distributors;

making the movie title information accessible by the rental applications, wherein making the movie title information accessible by the rental applications eliminates a need to manually enter information at the rental stores;

in response to a user accessing the repository database:

displaying a list of movie titles to a user based on the analyzed customer information;

displaying a combination of indicators from among a group comprising an in stock or out of stock indicator, an already rented/purchased indicator, an order command, an add to wish-list command, and an add to shopping cart command based on the analyzed customer information, wherein the customer information includes customer historical data; and displaying the combination of indicators adjacent to each movie title on the list that allow the user to take action with respect to a particular movie title, wherein a click on an indicator initiates a corresponding action, wherein the user is enabled to take the action on a same movie title page that displays the list of movie titles without having to navigate to a separate movie title page in order to take the action.

* * * * *